United States Patent
Pugh et al.

(10) Patent No.: US 10,472,449 B2
(45) Date of Patent: Nov. 12, 2019

(54) POLYBUTADIENE GRAFT COPOLYMERS AS COUPLING AGENTS FOR CARBON BLACK AND SILICA DISPERSION IN RUBBER COMPOUNDS

(71) Applicants: Coleen Pugh, Akron, OH (US); Sadhan C. Jana, Fairlawn, OH (US); Nicole Swanson, Stow, OH (US); Prasad Raut, Cuyahoga Falls, OH (US); Hamad Albehaijan, Copley, OH (US)

(72) Inventors: Coleen Pugh, Akron, OH (US); Sadhan C. Jana, Fairlawn, OH (US); Nicole Swanson, Stow, OH (US); Prasad Raut, Cuyahoga Falls, OH (US); Hamad Albehaijan, Copley, OH (US)

(73) Assignee: The University of Akron, Akron, OH (US)

( * ) Notice: Subject to any disclaimer, the term of this patent is extended or adjusted under 35 U.S.C. 154(b) by 98 days.

(21) Appl. No.: 15/490,298

(22) Filed: Apr. 18, 2017

(65) Prior Publication Data
US 2017/0298166 A1 Oct. 19, 2017

Related U.S. Application Data

(60) Provisional application No. 62/323,919, filed on Apr. 18, 2016.

(51) Int. Cl.
*C08F 279/02* (2006.01)
*B60C 1/00* (2006.01)
(Continued)

(52) U.S. Cl.
CPC .............. *C08F 279/02* (2013.01); *B60C 1/00* (2013.01); *B60C 1/0016* (2013.01); *C08K 3/04* (2013.01);
(Continued)

(58) Field of Classification Search
CPC .. C08F 279/02; C08F 230/08; C08F 2438/03; B60C 1/00; B60C 1/0016; C08K 3/36;
(Continued)

(56) References Cited

U.S. PATENT DOCUMENTS 8,980,392 B2 * 3/2015 Guy .................... C08K 3/36
428/36.9
2011/0224351 A1 * 9/2011 Mori ................. B60C 1/0016
524/458

OTHER PUBLICATIONS

Paz-Pazos et al., "Synthesis, Isolation, and Thermal Behavior of Polybutadiene Grafted with Poly(2,3,4,5,6-pentafluorostyrene)," J. Polym. Sci.: Part A, vol. 43, pp. 2874-2891. (Year: 2005).*
(Continued)

*Primary Examiner* — Josephine L Chang
(74) *Attorney, Agent, or Firm* — Renner Kenner Greive Bobak Taylor and Weber; Ray Weber

(57) ABSTRACT

Coupling agents useful for preparing vulcanized composition with filers such as silica and carbon black are provided. The coupling agents include fluorine substituted styrene compounds and styrene compounds containing a hydrocarbyloxysilane functional group. The coupling agents may be grafted onto polydiene polymers or added into a vulcanizable composition as an oligomer. The use of one or both of fluorine substituted styrene compounds and styrene compounds containing a hydrocarbyloxysilane functional group may improve the strength, rolling resistance, and/or cure rate of a vulcanized polymer compared to a vulcanized polymer without a coupling agent.

11 Claims, 4 Drawing Sheets

(51) Int. Cl.
    *C08F 230/08*    (2006.01)
    *C08K 3/04*      (2006.01)
    *C08K 3/36*      (2006.01)
    *C08L 51/00*     (2006.01)

(52) U.S. Cl.
    CPC .............. *C08K 3/36* (2013.01); *C08L 51/003* (2013.01); *C08F 2438/03* (2013.01); *Y02T 10/862* (2013.01)

(58) Field of Classification Search
    CPC ..... C08K 3/04; C08L 51/003; C08L 2205/03; Y02T 10/862
    USPC ........................................................ 524/504
    See application file for complete search history.

(56) References Cited

OTHER PUBLICATIONS

Bahl et al., "Polybutadiene-g-polypentafluorostyrene as coupling agent for lignin-filled rubber compounds," Polymer, vol. 55, No. 26 (Year: 2014).*

Swanson, N. "Polybutadiene Graft Copolymers as Coupling Agents in Rubber Compounding." Electronic Thesis or Dissertation. University of Akron, [retrieved on Jul. 27, 2018]. Retrieved from the Internet: <URL: http://rave.ohiolink.edu/etdc/view?acc_num=akron1473158881> (Year: 2016).*

* cited by examiner

POLYBUTADIENE GRAFT COPOLYMERS AS COUPLING AGENTS FOR CARBON BLACK AND SILICA DISPERSION IN RUBBER COMPOUNDS

CROSS-REFERENCE TO RELATED APPLICATIONS

This application claims priority from U.S. provisional patent application Ser. No. 62/323,919 filed on Apr. 18, 2016, which is incorporated herein by reference in its entirety.

STATEMENT REGARDING FEDERALLY SPONSORED RESEARCH OR DEVELOPMENT

This invention was made with government support grant number IIP1160982 awarded by the National Science Foundation. The government has certain rights in the invention.

FIELD OF THE INVENTION

Embodiments are directed to polymer compositions that include fluorine substituted styrene compounds and styrene compound containing a hydrocarbyloxysilane functional group as coupling agents. In certain embodiments, the fluorine substituted styrene compounds and styrene compounds containing a hydrocarbyloxysilane functional group may be grafted on to polymers. In other embodiments, an oligomer prepared from fluorine substituted styrene compounds and styrene compounds containing a hydrocarbyloxysilane functional group may be mixed with a polymer that includes units derived from the polymerization of styrene.

BACKGROUND OF THE INVENTION

Silica has been introduced as a filler in tire rubber compounding to provide improved traction, chunk and tear resistance of the rubber and to lower the rolling resistance. Silica particles have a strong tendency to aggregate due to the surface silanol (Si—OH) groups hydrogen bonding with one another causing difficulty in dispersion throughout the non-polar rubber matrix. Filler dispersion and reduction of filler-filler networking is an important aspect of rubber compounding. Desired targets on tear and rolling resistance are two properties affected by filler dispersion. To improve the filler dispersion in the rubber matrix, coupling agents have been introduced into rubber compounding. Coupling agents bridge the gap through physical or chemical bonding to improve filler dispersion between the non-polar rubber matrix and the polar filler surface. The most popular small-molecule bifunctional organosilane coupling agent used in rubber compounding with silica is bis(triethoxysilylpropyl) tetrasulfane) (TESPT or Si69). It contains triethoxysilane functional groups, which react and covalently bond with the Si—OH groups on the silica particle surface to improve the silica dispersion. The tetrasulfane linkage of TESPT undergoes crosslinking with the rubber chains during the curing of the rubber compound.

A typical tire tread rubber compound formulation incorporating silica as a filler does not solely rely on silica as the reinforcing filler; a hybrid filler system with carbon black and silica is common. Therefore, a coupling agent with the ability to interact with both carbon black and silica fillers is necessary. Poly(butadiene-graft-pentafluorostyrene) (PB-g-PPFS) has been studied as a coupling agent for both lignin and lignin-carbon black hybrid filler utilizing arene-perfluoroarene interactions between electron-deficient pentafluorostyrene and electron-rich lignin and carbon black π-systems. However, its interactions in a tire tread rubber compound formulation incorporating silica are limited. Therefore, there is a need in the art for coupling agents with the ability to couple fillers that include both carbon black and silica.

SUMMARY OF THE INVENTION

A first embodiment provides a method for preparing a grafted polymer comprising: preparing a reaction mixture comprising: a polydiene polymer, a styrene compound containing a hydrocarbyloxysilane functional group, and optionally a fluorine substituted styrene compound; and adding a radical initiator.

A second embodiment provides a method as in the first embodiment, where the polydiene polymer has a cis-1,4-linkage content of greater than 40%.

A third embodiment provides thermoset polyamide as in the first or second embodiment, where the polydiene polymer has a cis-1,4-linkage content of greater than 90%.

A fourth embodiment provides a method as in of the first through third embodiments, where the reaction mixture includes a fluorine substituted styrene compound.

A fifth embodiment provides a method as in of the first through fourth embodiments, where the fluorine substituted styrene compound is defined by the formula:

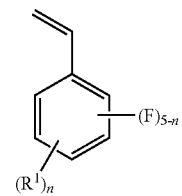

where $R^1$ is a monovalent organic group and n is an integer selected from 0 and 1.

A sixth embodiment provides a method as in of the first through fifth embodiments, where the fluorine substituted styrene compound is defined by the formula:

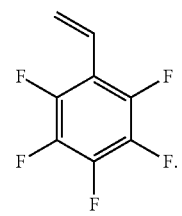

A seventh embodiment provides a method as in of the first through sixth embodiments, where the styrene compound containing a hydrocarbyloxysilane functional group is defined by the formula:

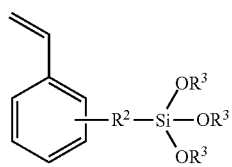

where $R^2$ is a divalent organic group and each $R^3$ is individually a monovalent organic group.

An eighth embodiment provides a method as in of the first through seventh embodiments, where $R^2$ is hydrocarbon group with from 1 to about 18 carbon atoms.

A ninth embodiment provides thermoset polyamide as in of the first through eighth embodiments, where each $R^3$ is individually a hydrocarbon group with from 1 to about 18 carbon atoms.

A tenth embodiment provides a method as in of the first ninth through embodiments, where the styrene compound containing a hydrocarbyloxysilane functional group is defined by the formula:

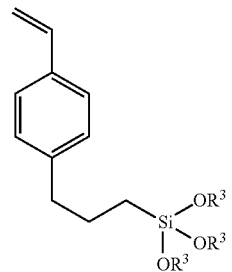

where each $R^3$ is individually monovalent organic group.

An eleventh embodiment provides a method as in of the first tenth through embodiments, where each $R^3$ is individually a hydrocarbon group with from 1 to about 18 carbon atoms.

A twelfth embodiment provides a copolymer comprising a mer unit derived from the polymerization of a fluorine substituted styrene compound and a mer unit derived from the polymerization of styrene compound containing a hydrocarbyloxysilane functional group.

A thirteenth embodiment provides a vulcanizable composition comprising:
a curative; a filler comprising carbon black and silica; and a polydiene grafted with a mer unit derived from the polymerization of a fluorine substituted styrene compound and a mer unit derived from the polymerization of styrene compound containing a hydrocarbyloxysilane functional group.

A fourteenth embodiment provides a composition as in the thirteenth embodiment, where the filler comprising carbon black and silica is premixed before being mixed with the polydiene grafted with a mer unit derived from the polymerization of a fluorine substituted styrene compound and a mer unit derived from the polymerization of styrene compound containing a hydrocarbyloxysilane functional group A fifteenth embodiment provides a composition as in the thirteenth embodiment or fourteenth embodiment, further comprising one or more synthetic or natural rubbers.

A sixteenth embodiment provides a tire or tire component comprising the reaction product of the vulcanizable composition of any of the thirteenth through fifteenth embodiments.

A seventeenth embodiment provides a vulcanizable composition comprising: a curative; a filler comprising carbon black and silica; a styrene-diene copolymer; and a copolymer comprising a mer unit derived from the polymerization of a fluorine substituted styrene compound and a mer unit derived from the polymerization of styrene compound containing a hydrocarbyloxysilane functional group.

An eighteenth embodiment provides a vulcanizable composition as in the seventeenth embodiment, where the filler comprising carbon black and silica is premixed before being mixed with the polydiene grafted with a mer unit derived from the polymerization of a fluorine substituted styrene compound and a mer unit derived from the polymerization of styrene compound containing a hydrocarbyloxysilane functional group A nineteenth embodiment provides a vulcanizable composition as in the seventeenth embodiment or eighteenth embodiment, further comprising one or more synthetic or natural rubbers.

A twentieth embodiment provides a tire or tire component comprising the reaction product of the vulcanizable composition of any of the seventeenth through nineteenth embodiments.

A twenty-first embodiment provides a vulcanizable composition comprising: a curative; silica; and a polydiene grafted with a mer unit derived from the polymerization of a styrene compound containing a hydrocarbyloxysilane functional group.

A twenty-second embodiment provides a vulcanizable composition as in the twenty-first embodiment, further comprising one or more synthetic or natural rubbers.

A twenty-third embodiment provides tire or tire component comprising the reaction product of the vulcanizable composition of either of the twenty-first or twenty-second embodiments.

Figure 1:
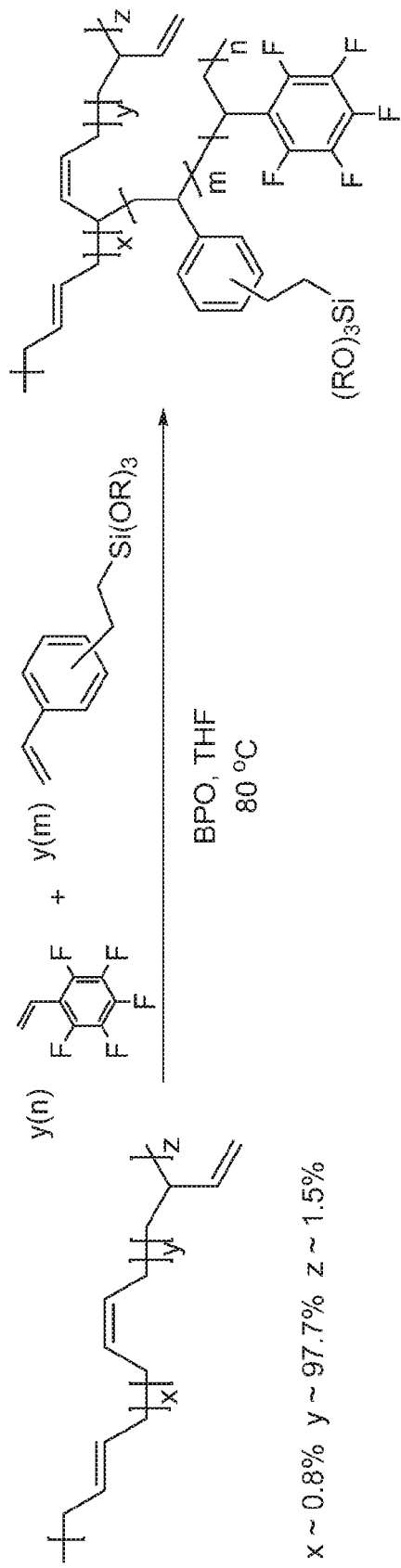
FIG. 1 provides a reaction scheme for preparing a grafted polymer by one or more embodiments, specifically where poly(butadiene-graft-(pentafluorostyrene-co-trialkoxy(4-vinylphenethyl)silane) is prepared with BPO as the initiator in THF. Grafting is shown only on the 1,4-cis PB repeat units due to its high concentration. The scheme is drawn to represent both the para- and meta-trialkoxysilane monomers.
Figure 2:
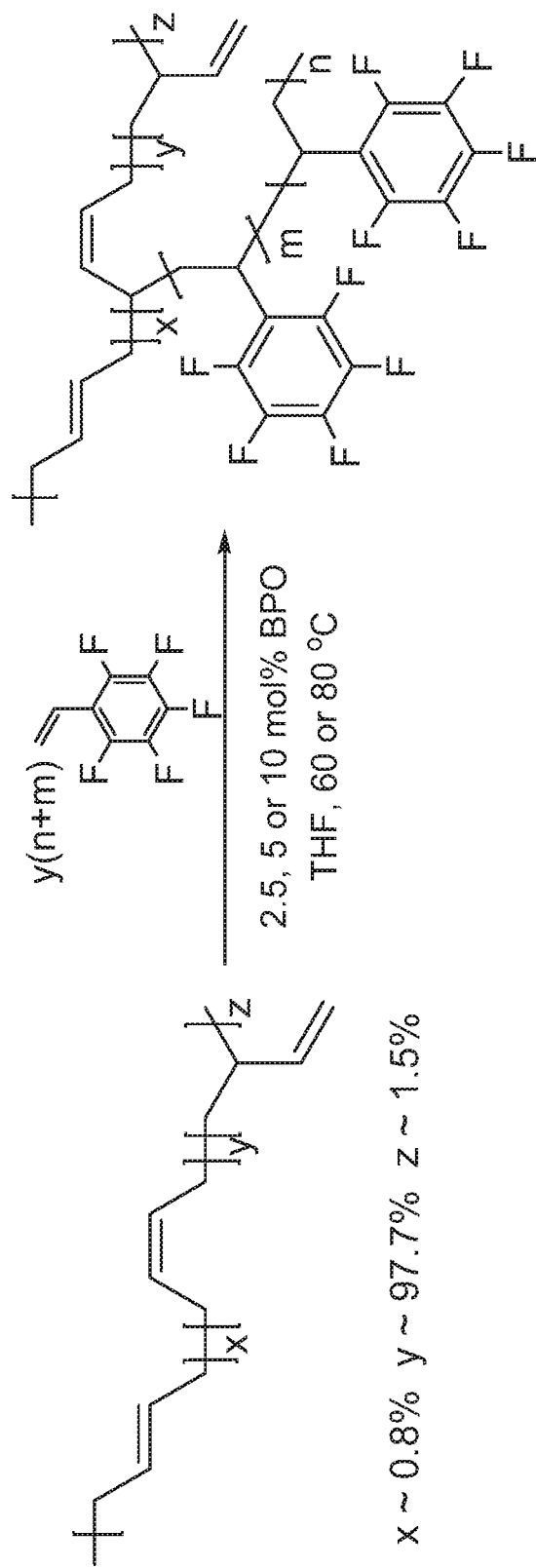
FIG. 2 provides a reaction scheme for preparing a grafted polymer by one or more embodiments, specifically where poly(butadiene-graft-pentafluorostyrene) is prepared with BPO as the initiator in THF. Grafting is shown only on the 1,4-cis PB repeat units due to its high concentration.
Figure 3:
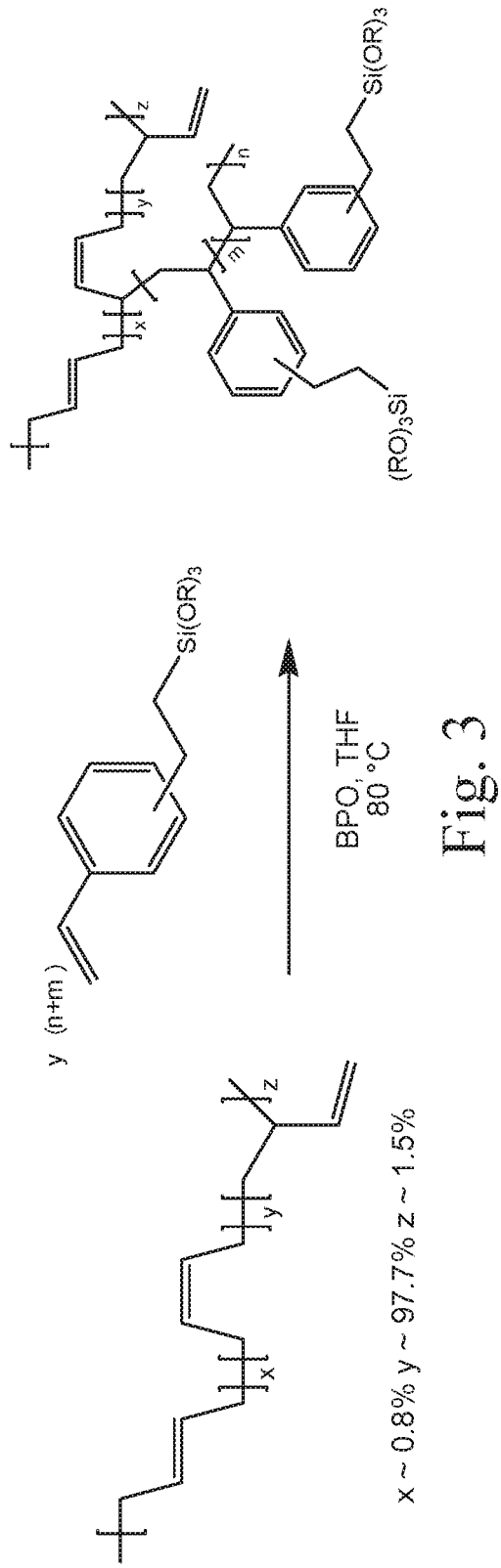
FIG. 3 provides a reaction scheme for preparing a grafted polymer by one or more embodiments, specifically where poly(butadiene-graft-trialkoxy(4-vinylphenethyl)silane) is prepared with BPO as the initiator in THF. Grafting is shown only on the 1,4-cis PB repeat units due to its high concentration. The scheme is drawn to represent both the para- and meta-trialkoxysilane monomers.
Figure 4:
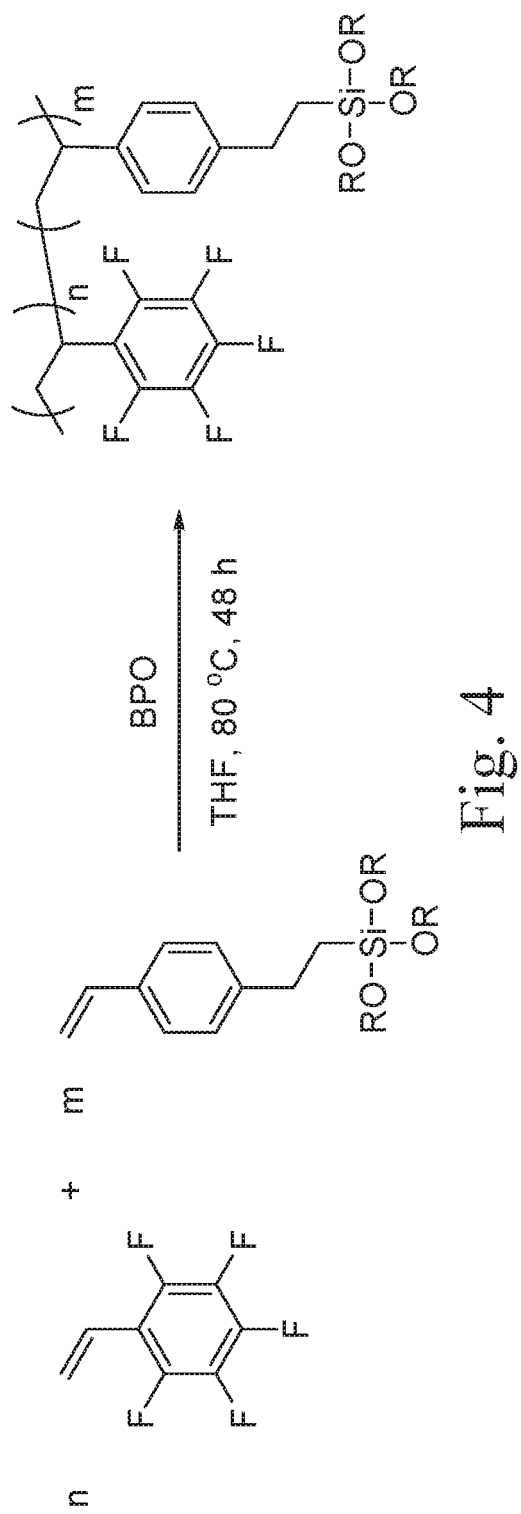
FIG. 4 provides a reaction scheme for preparing an oligomer comprising a mer unit derived from the polymerization of a fluorine substituted styrene compound and a mer unit derived from the polymerization of styrene compound containing a hydrocarbyloxysilane functional group by one or more embodiments, specifically where P(PFS-co-StSi (OR)$_3$) oligomers are prepared using 10 mol % BPO initiator and a 70:30 PFS:StSi(OR)$_3$ monomer ratio where R=—CH$_2$CH$_3$, —CH$_2$CH$_2$CH$_3$ or 2:1 —CH$_2$CH$_3$.

—(CH$_2$)$_{11}$CH$_3$. The para-substituted trialkoxysilane moiety is drawn for simplicity, but meta-isomer also present.

DETAILED DESCRIPTION OF ILLUSTRATIVE EMBODIMENTS

Introduction

On or more embodiments are based on the finding that fluorine substituted styrene compounds and styrene compounds containing a hydrocarbyloxysilane functional group may be used in vulcanized rubber compositions to couple fillers. Advantageously, fluorine substituted styrene compounds have been found to be useful coupling agents when carbon black is used as a filler and styrene compounds containing a hydrocarbyloxysilane functional group have been found to be useful when silica is used as a filler. In one or more embodiments, styrene compounds containing a hydrocarbyloxysilane functional group and/or fluorine substituted styrene compounds and may be grafted on to polymers. In other embodiments, an oligomer prepared from fluorine substituted styrene compounds and styrene compounds containing a hydrocarbyloxysilane functional group may be mixed with a polymer that includes units derived from the polymerization of styrene. The use of one or both of fluorine substituted styrene compounds and styrene compounds containing a hydrocarbyloxysilane functional group may improve the strength, rolling resistance, and/or cure rate of a vulcanized polymer compared to a vulcanized polymer without a coupling agent.

Coupling agents bridge the gap between two incompatible materials, such as a non-polar rubber matrix and a filler with a polar surface. As noted above, fluorine substituted styrene compounds and styrene compounds containing a hydrocarbyloxysilane functional group have been found to be useful as coupling agents.

Fluorine substituted styrene compounds include those styrene compounds where one or more hydrogen atoms on the benzene ring have been substituted or replaced with a fluorine atom. In one or more embodiments, the fluorine substituted styrene compounds may be defined by formula I:

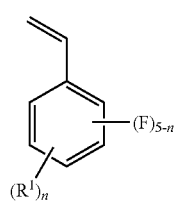

where R$^1$ is a monovalent organic group and n is an integer selected from 0 and 1.

In one or more embodiments, the monovalent organic groups suitable for use in the coupling agents may be a linear, branched, or cyclic hydrocarbon groups or substituted hydrocarbon groups. The monovalent organic groups may contain from 1 carbon atom, or the appropriate minimum number of carbon atoms to form the group. In these or other embodiment, the monovalent organic groups may include 1 to about 18 carbon atoms, in other embodiments 2 to about 12 carbon atoms, and in other embodiments 3 to about 8 carbon atoms. Suitable substitutions include replacing a hydrogen or a carbon atom with an oxygen atom, nitrogen atom, sulfur atom, or a halogen atom.

In certain embodiments, where n of formula I is 0, the fluorine substituted styrene compounds may be defined by formula II:

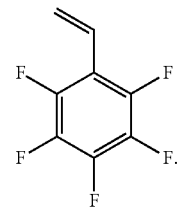

A styrene compound containing a hydrocarbyloxysilane functional group include those compounds where a hydrocarbyloxysilane group is bonded or attached though an organic group to a styrene molecule. In one or more embodiments, the styrene compound containing a hydrocarbyloxysilane functional group may be defined by formula III:

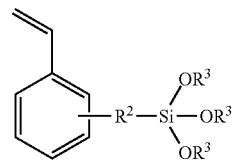

where R$^2$ is a divalent organic group and each R$^3$ is individually a monovalent organic group.

In one or more embodiments, the divalent organic groups suitable for use in the coupling agents may be a linear, branched, or cyclic hydrocarbon groups or substituted hydrocarbon groups. The divalent organic groups may contain from 1 carbon atom, or the appropriate minimum number of carbon atoms to form the group. In these or other embodiment, the monovalent organic groups may include 1 to about 18 carbon atoms, in other embodiments about 2 to about 12 carbon atoms, and in other embodiments about 3 to about 8 carbon atoms. Suitable substitutions include replacing a hydrogen or a carbon atom with an oxygen atom, nitrogen atom, sulfur atom, or a halogen atom.

In certain embodiments, where the hydrocarbyloxysilane functional group of formula III is attached through a methylene or polymethylene group to the para position of the styrene, the styrene compound containing a hydrocarbyloxysilane functional group may be defined by formula IV:

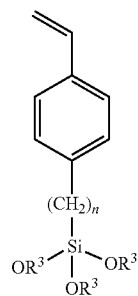

where n is an integer from about 1 to about 12 and each R$^3$ is individually a monovalent organic group. In one or more embodiments, n may be from about 2 to 8, and in other embodiments from about 3 to about 6. In certain embodiments, where the n group of formula IV is 3, the styrene compound containing a hydrocarbyloxysilane functional group may be defined by formula V:

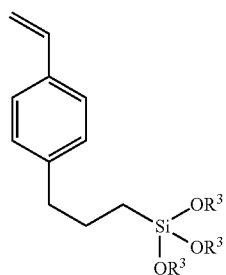

where each $R^3$ is individually monovalent organic group.

Grafted Polymers

As noted above, fluorine substituted styrene compounds and styrene compounds containing a hydrocarbyloxysilane functional group have been found to be useful as graft copolymers. A graft copolymer is one in which one or more blocks of monomer are grafted onto a main chain of a second polymer. Stated differently, the graft copolymer includes units derived from the polymerization of styrene compounds containing a hydrocarbyloxysilane functional group and/or fluorine substituted styrene compounds pendently attached to along a polymer chain. As used herein, the phrase "derived from" may be used to describe the portion of a polymer (i.e. mer unit) that results from the polymerization of a monomer (which may include the coupling agents). For example, the resulting grafted polymer prepared from grafting styrene compounds containing a hydrocarbyloxysilane functional group to a polydiene may be described as including a unit derived from a styrene compound containing a hydrocarbyloxysilane functional group.

In one or more embodiments, a graft copolymer may be prepared by combining a polydiene polymer with at least one of fluorine substituted styrene compound and the styrene compound containing a hydrocarbyloxysilane functional group and then adding a radical initiator.

Suitable polydiene polymers may be purchased or prepared through conventional polymerization methods. Conventional polymerization methods include the use of anionic initiators and coordination catalyst. Examples of polydiene polymers or polymers that include polydiene polymers include but are not limited to polyisoprene, styrene-butadiene, butyl, and ethylene-propylene, polybutadiene.

Those skilled in the art will appreciate that polydiene polymers have three main microstructure forms: cis-1,3-polydiene, trans-1,4-polydiene, and vinyl-1,2-polydiene. While not wishing to be bound by any particular theory of operation, it is believed that the coupling agents graft or attach predominately to mer units in the with cis-1,4-linkage. In one or more embodiments, the polydiene polymer may be characterized by the percentage of cis-1,4-linkage, which may be measured by Fourier transform infrared spectroscopy The percentage cis-1,4-linkage refers to the amount of mer units with a cis-1,4-microstrucutre out of the total mer units in the polymer. that take the of In one or more embodiments, the polydiene polymer has a cis-1,4-linkage content of a greater than 40%, in other embodiments greater than 50%, in other embodiments greater than 60%, in other embodiments greater than 80%, and in other embodiments greater than 90%. In one or more embodiments, the polydiene polymer has a cis-1,4-linkage content of a less than 99%, in other embodiments greater than 98%, in other embodiments greater than 95%, in other embodiments greater than 65%, and in other embodiments greater than 60%. In one or more embodiments, the polydiene polymer has a cis-1,4-linkage content of a of about 40% to about 99%, in other embodiments of about 40% to about 60%, and in other embodiments of about 60% to about 99%

In one or more embodiments, the polydiene may be characterized by the number average molecular weight, which may be determined through gel permeation chromatography. In one or more embodiments, the polydiene has a number average molecular weight of at least 10 kDa, in other embodiments at least 50 kDA and in other embodiments, at least 100 kDA. In one or more embodiments, the polydiene has a number average molecular weight of at most 1,000 kDa, in other embodiments at most 750 kDa and in other embodiments, at most 550 kDa. In one or more embodiments, the polydiene has a number average molecular weight of about 10 kDa to about 1,000 kDa, in other embodiments of about 50 kDa to about 750 kDa, and in other embodiments of about 100 kDa to about 550 kDa.

Suitable radical initiators for initiating the polymers include, but are not limited to benzoyl peroxide (BPO).

In one or more embodiments, where the graft copolymer is prepared using a styrene compound containing a hydrocarbyloxysilane functional group, the reaction mixture for the grafting reaction may be characterized by the amount of styrene compound containing a hydrocarbyloxysilane functional group used with respect to the weight of the silica filler. In one or more embodiments, from about 3% to about 15%, in other embodiments from about 4% to about 12%, and in other embodiments from about 5% to about 10% of the styrene compound containing a hydrocarbyloxysilane functional group is used by weight percentage of the silica filler.

In one or more embodiments, where the graft copolymer is prepared using a fluorine substituted styrene compound, the reaction mixture for the grafting reaction may be characterized by the amount of the fluorine substituted styrene compound used with respect to the weight of the carbon black filler. In one or more embodiments, from about 3% to about 15%, in other embodiments from about 4% to about 12%, and in other embodiments from about 5% to about 10% of the fluorine substituted styrene compound is used by weight percentage of the carbon black filler.

In one or more embodiments, were the graft copolymer is prepared using a styrene compound containing a hydrocarbyloxysilane functional group and a fluorine substituted styrene compound the reaction mixture for the grafting reaction may be characterized by the molar ratio of the styrene compound containing a hydrocarbyloxysilane functional group to the fluorine substituted styrene compound. In one or more embodiments, the molar ratio of the styrene compound containing a hydrocarbyloxysilane functional group to the fluorine substituted styrene compound is from about 1:10 to about 10:1, in other embodiments from about 1:5 to about 5:1, and in other embodiments from about 1:2 to about 2:1. In one or more embodiments, the molar ratio of the styrene compound containing a hydrocarbyloxysilane functional group to the fluorine substituted styrene compound is about 1:1.

Oligomers

As noted above, oligomers of fluorine substituted styrene compounds and styrene compounds containing a hydrocarbyloxysilane functional group have been found to be useful as coupling agents in rubber compounds that include a styrene-containing polymer. In these or other embodiments, an oligomer of the coupling agents is mixed with a styrene containing polymer in a vulcanizble composition. Suitable styrene containing polymers include, but are not limited to, styrene-butadiene. The oligomers may be random block oligomers of the fluorine substituted styrene compounds and styrene compounds containing a hydrocarbyloxysilane functional group.

Methods for preparing oligomers may be described in Swanson, N., POLYBUTADIENE GRAFT COPOLYMERS AS COUPLING AGENTS IN RUBBER COMPOUNDING, University of Akron (2016), which is incorporated herein by reference in its entirety.

In one or more embodiments, the styrene-containing polymer may be characterized by the molar percent of styrene content (i.e. the mer unites of styrene per total mer units in the polymer). In one or more embodiments, the styrene-containing polymer is about 1% to about 50 styrene, in other embodiments about 2% to about 35% styrene, in other embodiments about 3% to about 25% styrene, in other embodiments about 3% to about 35% styrene, in other embodiments about 5% to about 25% styrene, and in other embodiments about 10% to about 20% styrene.

The oligomers of fluorine substituted styrene compounds and styrene compounds containing a hydrocarbyloxysilane functional group may be referred to for the purpose of this specification as a coupling oligomer.

In one or more embodiments, the coupling oligomer may be characterized by its number average molecular weight, which may be determined through gel permeation chromatography. In one or more embodiments, the coupling oligomer has a number average molecular weight of at least 0.5 kDa in other embodiments at least 1 kDa and in other embodiments, at least 2.5 kDa In one or more embodiments, the coupling oligomer has a number average molecular weight of at most 25 kDa in other embodiments at most 20 kDa and in other embodiments at most 10 kDa. In one or more embodiments, the coupling oligomer has a number average molecular weight of about 0.5 kDa to about 25 kDa, in other embodiments of about 1 kDa to about 20 kDa, and in other embodiments of about 2.5 kDa to about 10 kDa In one or more embodiments, the coupling oligomer may be characterized by the percent of mer units in moles that derive from the polymerization of styrene compounds containing a hydrocarbyloxysilane functional group out of the total mer units in the oligomer. In one or more embodiments, the oligomer is from about 5% to about 95%, in other embodiments from about 20% to about 80%, and in other embodiments from about 40% to about 60% styrene compounds containing a hydrocarbyloxysilane functional group. In these or other embodiments, the balance of the mer units derive from fluorine substituted styrene compounds.

Vulcanizable Compositions/Rubber Compounding

The coupling agents may be used in a vuclanizable composition. In one or more embodiments, a vulcanizable composition comprises a curative, a filler, a coupling agent and an elastomer. Curatives are generally sulfur or sulfur compounds. Exemplary curatives include but are not limited to sulfur chloride, sulfur dichloride, high molecular polysulfide, morpholine disulfide and alkyl phenol disulfide.

In one or more embodiments, where a polymer grafted with a fluorine substituted styrene compound is employed as a coupling agent, a vulcanizable composition may comprise, a curative, carbon black, and a polydiene grafted with a mer unit derived from the polymerization of a fluorine substituted styrene compound.

In one or more embodiments, where a polymer grafted with a styrene compound containing a hydrocarbyloxysilane functional group is employed as a coupling agent, a vulcanizable composition may comprise, a curative, silica, and a polydiene grafted with a mer unit derived from the polymerization of styrene compound containing a hydrocarbyloxysilane functional group.

In one or more embodiments, where a polymer grafted with a styrene compound containing a hydrocarbyloxysilane functional group and fluorine substituted styrene compound is employed as a coupling agent, a vulcanizable composition may comprise, a curative, silica, carbon black, a and polydiene grafted with a mer unit derived from the polymerization of a fluorine substituted styrene compound and a mer unit derived from the polymerization of styrene compound containing a hydrocarbyloxysilane functional group.

In one or more embodiments, where an oligomer that prepared from the polymerization of a styrene compound containing a hydrocarbyloxysilane functional group and a fluorine substituted styrene compound is employed as a coupling agent, a vulcanizable composition may comprise, a curative, silica, carbon black, a styrene-diene copolymer; and an oligomer comprising a mer unit derived from the polymerization of a fluorine substituted styrene compound and a mer unit derived from the polymerization of styrene compound containing a hydrocarbyloxysilane functional group.

The vulcanizable composition may also include optional ingredients such additional elastomers, additional fillers, vulcanization accelerators, antioxidants, antiozonants, and plasticizers. Suitable elastomers include natural rubber and synthetic rubbers. Exemplary synthetic rubbers include polyisoprene, styrene-butadiene, butyl, ethylene-propylene, and polybutadiene. Additional fillers include titanium oxide, aluminum silicate, clay and talc. Suitable accelerators include sulfenamides, thiurams, thiazoles and guanidine.

Suitable fillers include carbon black and silica. Exemplary silicas include precipitated silicas, fumed, and surface-treated silica products. Exemplary carbon blacks include furnace, thermal, and channel. While carbon black and/or silica may be used with any coupling agent described, certain coupling agents, result in advantageous properties in the vulcanized composition. In one or more embodiments, where carbon black is used as a filler, the fluorine substituted styrene compound may advantageously be employed as a coupling agent. In one or more embodiments, where silica is used as a filler, the styrene compound containing a hydrocarbyloxysilane functional group may advantageously be employed as a coupling agent. Optional fillers include titanium oxide, aluminum silicate, clay and talc.

In one or more embodiments, a vulcanizable composition may be produced by kneading according to the conventional methods using a mixing machine such as Banbury mixer, a kneader or rolls. In certain embodiments, were both silica and carbon black are employed as a filer, the filler may be premixed prior to adding it to the vulcanizable composition. In these or other embodiments, optional additives, the filler and the rubber component are mixed. After the optional additives, the filler and the rubber component are mixed, a vulcanizing agent and a vulcanization accelerator are added to and mixed with the mixture to prepare a vulcanizable composition.

In one or more embodiments, the vulcanizable composition may be formed into a tire or a tire part by molding or extrusion. Once formed into a part, the vulcanizable composition may be vulcanized. Exemplary temperatures for vulcanization are from about from 140 to about 180° C. Suitable tires for the vulcanizable composition include large-sized tire of a passenger car, a truck and a bus.

Exemplary tire parts for the vulcanizable composition include a tread part, a sidewall part, a bead part and a rubber for covering a tire cord of a pneumatic tire.

While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXAMPLES

Materials 2,6-Di-t-butyl-p-cresol (butylated hydroxytoluene, BHT, Alfa Aesar), divinylbenzene (DVB, Aldrich, 97%, or Dow Chemical, 79-81%, mixture of isomers), dodecanol (Aldrich, 98%), methanol (Aldrich, reagent grade), polybutadiene (Goodyear, $M_n$=1.25×10$^5$ g/mol, PDI=4.6, 97.7% 1,4-cis, 0.8% 1,4-trans, 1.5% 1,2-vinyl content according to supplier; $GPC_{PSt}$ $M_n$=1.11×10$^5$ g/mol, PDI=3.55, RI detector), and trichlorosilane (Alfa Aesar, 98%) were used as received. Acetonitrile (Aldrich) was dried on a PureSolv system with an activated alumina column. Azobisisobutyronitrile (AIBN, Pfaltz & Bauer) was recrystallized from methanol below 40° C. Benzoyl peroxide (BPO, Aldrich, 97%) was recrystallized from chloroform and methanol (1:3 v/v) below 25° C. and stored in a freezer at <−10° C. Bis(triphenylphosphine)palladium(II) chloride was synthesized by a previous student, Dr. Bill Storms-Miller, following a previously reported literature procedure. Cumyldithiobenzoate (CDTB) was synthesized by Dr. Bill Storms-Miller, following a previously reported literature procedure. N,N'-Diisopropylethylamine (DIPEA, Chem Impex International) was distilled from $CaH_2$ and stored over potassium hydroxide (KOH) pellets. Ethanol (Aldrich) and n-propanol (Alfa Aesar, 99+%) were refluxed over and distilled from calcium oxide (CaO). Reagent grade hexanes (Aldrich) was washed with 5% $HNO_3$ in $H_2SO_4$ then washed with 5% w/v $NaHCO_3$ and rinsed with water until the aqueous wash was neutral and dried over $CaCl_2$ before distillation from purple sodium benzophenone ketyl under $N_2$. The 2,3,4,5,6-pentafluorostyrene monomer (PFS, Oakwood, 98%) was passed through a short plug of basic activated alumina to remove the inhibitor, prior to use. Styrene (Acros, 99%) was passed through a short plug of basic activated alumina to remove the inhibitor and distilled under vacuum (12 mm Hg), prior to use. Reagent grade tetrahydrofuran (Aldrich) was dried by distillation from purple sodium benzophenone ketyl under $N_2$ when used in polymerization and from $LiAlH_4$ when used in GPC measurements, GPC sample preparation, and UV-vis measurements.

Techniques

All reactions (under $N_2$ atmosphere) were conducted on a Schlenk line unless noted otherwise. $^1$H (300 or 500 MHz), $^{13}$C (75 or 126 MHz), $^{19}$F (297 MHz) and $^{29}$Si (99 MHz) NMR spectra (δ, ppm) were recorded on a Varian Mercury 300 spectrometer or a Varian 500 spectrometer, respectively. 2-D NMR spectra were recorded on the Varian 500 spectrometer. All spectra were recorded in $CDCl_3$ referenced to tetramethylsilane (TMS, 0.0 ppm). Number- ($M_n$) and weight-average ($M_w$) molecular weights and polydispersities (Đ=$M_w/M_n$) were determined by gel permeation chromatography ($GPC_{PSt}$) relative to linear polystyrene (Polymer Laboratories) from calibration curves of log $M_p$ vs. elution time at 35° C. using THF as eluent (1.0 mL/min), a guard column and a set of 50, 100, 500 and 10$^4$ Å Styragel and AM GPC linear (mixed bed) 5 µm columns, a Waters 486 tuneable UV/Vis detector set at 254 nm, a Waters 410 differential refractometer and Millennium Empower 3 software. UV-vis spectra were measured using a Hewlett Packard Model 8453 spectrometer at wavelengths of 200 to 400 nm with samples contained in quartz cuvette cells using THF, as the solvent and reference. The concentrations 0.02-0.1 g/L were chosen to produce optimum absorbance values within the Beer-Lambert law.

Synthesis of Small Molecule Monomers

Synthesis of Triethoxy(4-vinylphenethyl)silane (StSi(OEt)$_3$)

Trichlorosilane (7.7 mL, 76 mmol) was added dropwise over 30 min to a solution of bis(triphenylphosphine)palladium(II) chloride (0.118 g, 0.17 mmol) and divinylbenzene (12 mL, 84 mmol) stirring in a water bath at 40° C. After complete addition, the reaction was stirred for 3 h at 40° C. under $N_2$, then cooled to 20° C. by adding ice to the water bath. N,N'-Diisopropylethylamine (47 mL, 0.27 mol) and dry hexanes (35 mL, 0.27 mol) were added to the flask to form a dark yellow solution. Ethanol (17 mL, 0.29 mol) was added dropwise over 22 min stirring at 20° C. and stirred overnight (15 h) at room temperature upon complete addition. The solution was filtered over a pad of Celite to remove the amine salts and rinsed with diethyl ether (50 mL). The organic layers were washed with deionized water (4×10 mL) and the combined water layer was extracted with diethyl ether (4×10 mL). The combined organic layer was dried over $MgSO_4$, filtered to remove the drying agent, and concentrated by rotary evaporation. The crude product was purified by distillation under reduced pressure (1-2 mm Hg) and collected at 111-113° C. to yield 12 g (48%) as a colorless liquid. $^1$H-NMR (500 MHz)—para-isomer, major product: 1.15 (t, $CH_3$, $^3$J=7.0 Hz), 1.41 (t, $ArCH_2CH_2Si$, $^3$J=7.4 Hz), 2.32 (q, $ArCH_2CH_2Si$, $^3$J=7.4 Hz), 3.73 (q, $SiOCH_2CH_3$, $^3$J=7.0 Hz), 5.20 (d, $HCH_{cis}$, $^3$J=10.9 Hz), 5.72 (d, $HCH_{trans}$, $^3$J=17.6 Hz), 6.69 (dd, =CHAr, $^3$J=17.6 Hz, $^3$J=10.9 Hz), 7.18 (s, aromatic H at C3, C5), 7.29 (s, aromatic H at C2, C6). $^{13}$C-NMR (125 MHz): 15.54 ($ArCH_2CH_2Si$), 18.20 (Si($OCH_2CH_3$)), 26.14 ($ArCH_2CH_2Si$), 58.82 (Si($OCH_2CH_3$)), 113.13 ($H_2C$=), 122.84 (Ar, C3), 125.98 (Ar, C2), 137.23 (Ar, C1), 137.31 (=CHAr), 144.29 (Ar, C4). $^{29}$Si DEPT-NMR (99 MHz): −52.3 (s, para-Si of ethyl impurity), −52.4 (s, meta-Si of ethyl impurity), −52.6 (s, para-Si product), −52.7 (s, meta-Si of product).

Synthesis of Tripropoxy(4-vinylphenethyl)silane (StSi(OPr)$_3$)

Trichlorosilane (7.7 mL, 76 mmol) was added dropwise over 40 min to a solution of bis(triphenylphosphine)palladium(II) chloride (0.118 g, 0.17 mmol) and divinylbenzene (12 mL, 84 mmol) stirring in a water bath at 40° C. After complete addition, the reaction was stirred for 3 h at 40° C. under $N_2$, and then cooled to 20° C. by adding ice to the water bath. N,N'-Diisopropylethylamine (46 mL, 0.26 mol) and dry hexanes (31 mL, 0.24 mol) were added to the flask to form a dark yellow solution. n-Propanol (22 mL, 0.29 mol) was added dropwise over 24 min at 20° C. and stirred overnight (15 h) at room temperature upon complete addition. The solution was filtered over a pad of Celite to remove the amine salts and rinsed with diethyl ether (50 mL). The organic layer was washed with deionized water (4×10 mL) and the combined water layer was extracted with diethyl ether (4×10 mL). The combined organic layer was dried over MgSO$_4$, filtered to remove the drying agent, and concentrated by rotary evaporation. The crude product was purified by distillation under reduced pressure (1-2 mm Hg) and collected at 105-107° C. to yield 14 g (50%) as a colorless liquid. $^1$H-NMR (500 MHz)—para-isomer, major product: 0.87 (t, SiOCH$_2$CH$_2$CH$_3$, $^3$J=7.4 Hz), 1.43 (t, ArCH$_2$CH$_2$Si, $^3$J=7.5 Hz), 1.52 (dq, SiOCH$_2$CH$_2$CH$_3$, $^3$J=7.4 Hz) 2.33 (q, ArCH$_2$CH$_2$Si, $^3$J=7.5 Hz), 3.62 (t, SiOCH$_2$CH$_2$CH$_3$, $^3$J=6.6 Hz), 5.20 (d, HCH$_{cis}$, $^3$J=10.9 Hz), 5.72 (d, HCH$_{trans}$, $^3$J=17.6 Hz), 6.70 (dd, =CHAr, $^3$J=17.6 Hz, $^3$J=10.9 Hz), 7.20 (s, aromatic H at C3, C5), 7.29 (s, aromatic H at C2, C6). $^{13}$C-NMR (125 MHz): 10.15 (Si(OCH$_2$CH$_2$CH$_3$)) 15.56 (ArCH$_2$CH$_2$Si), 25.66 (Si(OCH$_2$CH$_2$CH$_3$)) 26.16 (ArCH$_2$CH$_2$Si), 64.80 (Si(OCH$_2$CH$_2$CH$_3$)), 113.07 (H$_2$C=), 125.91 (Ar, C2), 126.02 (Ar, C3), 134.21 (Ar, C1), 137.32 (=CHAr), 144.37 (Ar, C4). $^{29}$Si DEPT-NMR (99 MHz): −52.72 (s, para-Si of ethyl impurity), −52.89 (s, meta-Si of ethyl impurity), −53.09 (s, para-Si product), −53.19 (s, meta-Si of product).

Synthesis of Dodecyloxy(diethoxy)(4-vinylphenethyl)silane (StSi(ODod)(OEt)$_2$)

Trichlorosilane (3.2 mL, 32 mmol) was added dropwise over 24 min to a solution of bis(triphenylphosphine)palladium(II) chloride (49 mg, 69 µmol) and divinylbenzene (5 mL, 0.04 mol) stirring in a water bath at 40° C. After complete addition, the reaction was stirred for 3 h at 40° C. under N$_2$ then cooled to 20° C. by adding ice to the water bath. N,N'-Diisopropylethylamine (20 mL, 0.12 mol) and dry hexanes (14 mL, 0.11 mol) were added to the flask to form a dark yellow solution. Dodecanol (8.6 mL, 38 mmol) and ethanol (4.5 mL, 77 mmol) were combined and added dropwise over 25 min at 20° C. and stirred overnight (15 h) at room temperature upon complete addition. The solution was filtered through a pad of Celite to remove the amine salts and rinsed with diethyl ether (25 mL). The organic layer was washed with deionized water (3×10 mL) and the combined water layer was extracted with diethyl ether (3×10 mL). The combined organic layer was dried over MgSO$_4$, filtered to remove the drying agent, and concentrated by rotary evaporation. The crude product was purified by distillation under reduced pressure (1-2 mm Hg) and collected at 94-95° C. to yield 3.1 g (21%) as a colorless liquid. $^1$H-NMR (500 MHz)—para-isomer, major product: 0.88 (t, SiO(CH$_2$)$_{11}$CH$_3$, $^3$J=7.0 Hz), 1.15 (t, SiOCH$_2$CH$_3$, $^3$J=7.0 Hz) 1.27-1.34 (m, SiOCH$_2$CH$_2$CH$_2$(CH$_2$)$_8$CH$_3$, $^3$J=7.0 Hz), 1.42 (t, ArCH$_2$CH$_2$Si, $^3$J=7.4 Hz), 1.56 (dt, SiOCH$_2$CH$_2$CH$_2$(CH$_2$)$_8$CH$_3$, $^3$J=14.3 Hz, $^3$J=7.0 Hz) 2.32 (q, ArCH$_2$CH$_2$Si, $^3$J=7.6 Hz), 3.62 (t, SiOCH$_2$CH$_3$, $^3$J=6.7 Hz), 3.73 (q, SiOCH$_2$(CH$_2$)$_{10}$CH$_3$ $^3$J=7.0 Hz), 5.19 (d, HCH$_{cis}$, $^3$J=10.9 Hz), 5.72 (d, HCH$_{trans}$, $^3$-17.6 Hz), 6.69 (dd, =CHAr, $^3$J=17.6 Hz, $^3$J=10.9 Hz), 7.18 (s, aromatic H at C3, C5), 7.29 (s, aromatic H at C2, C6). $^{13}$C-NMR (125 MHz): 14.05 (SiO(CH$_2$)$_{11}$CH$_3$), 18.15 (SiOCH$_2$CH$_3$), 22.65 (SiO(CH$_2$)$_{10}$CH$_2$CH$_3$), 25.74 (ArCH$_2$CH$_2$Si), 26.09 (ArCH$_2$CH$_2$Si), 29.32 (SiO(CH$_2$)$_8$CH$_2$(CH$_2$)$_2$CH$_3$), 29.43 (SiO(CH$_2$)$_2$CH$_2$(CH$_2$)$_8$CH$_3$), 29.58-29.64 (SiO(CH$_2$)$_3$(CH$_2$)$_5$(CH$_2$)$_3$CH$_3$), 58.79 (SiOCH$_2$CH$_3$), 62.98 (SiOCH$_2$(CH$_2$)$_{10}$CH$_3$), 113.08 (H$_2$C=), 125.93 (Ar, C2), 128.15 (Ar, C3), 136.85 (Ar, C1), 137.28 (=CHAr), 144.22 (Ar, C4). $^{29}$Si DEPT-NMR (99 MHz): −52.20 (s, para-Si of ethyl impurity), −52.39 (s, meta-Si of ethyl impurity), −52.59 (s, para-Si product), −52.70 (s, meta-Si of product).

Polymerizations

Synthesis of Poly(2,3,4,5,6-pentafluorostyrene)

The PPFS homopolymer was synthesized following a previously reported in Paz-Pazos, M.; Pugh, C. Synthesis, Isolation, and Thermal Behavior of Polybutadiene Grafted with poly(2,3,4,5,6-Pentafluorostyrene). *J. Polym. Sci. Part A Polym. Chem.* 2005, 43 (13), 2874-2891, which is incorporated herein by referance. The PPFS homopolymer was synthesized for calibration of the GPC UV-detector response at 254 nm to determine monomer conversion and the grafting parameters of the PB-g-PPFS graft copolymers.

A solution of PFS (0.39 g, 2.0 mmol) and BPO (0.025 g, 0.1 mmol) in dry THF (13 mL) was degassed in a Schlenk tube by four freeze-pump-thaw cycles (5-10-5 min) and stirred at 75° C. for 48 h under N$_2$. The polymerization solution was immersed in an ice water bath to stop the polymerization and precipitated in cold methanol (100 mL). The white precipitate was collected in a frit and dried in vacuo overnight to yield 0.20 g (51%) of PPFS as a white, electrostatic powder; GPC$_{PSt}$: M$_n$=4.58 kDa, Đ=1.36. $^1$H NMR (300 MHz): 2.00 (broad s, CH$_2$CHAr), 2.40 (broad s, mr+rr CH$_2$CHAr), 2.75 (broad s, mm CH$_2$CHAr). $^{19}$F NMR (297 MHz): −162.0 (s, C3-F), −154.1 (s, C4-F), −143.4 (broad s, C2-F).

Synthesis of Poly(triethoxy(4-vinylphenethyl)silane) (P(StSi(OEt)$_3$))

A solution of StSi(OEt)$_3$ (0.74 g, 2.0 mmol) and BPO (48 mg, 0.2 mmol) in dry THF (8 mL) was degassed in a dried 15 mL round bottom flask equipped with a stir bar, perfluoro o-ring and high vacuum adapter by four freeze-pump-thaw cycles (10-10-5 min), sealed under vacuum (1-2 mm Hg) on the 4$^{th}$ cycle and stirred at 80° C. for 48 h. The polymerization solution was immersed in an ice water bath to quench the polymerization and precipitated in cold, dry acetonitrile (45 mL). The white, opaque solution was capped and placed in a freezer for 3 days, and then centrifuged for 5 min at 3000 rpm. The acetonitrile was decanted from the colorless, viscous precipitate to yield 0.06 g (10%) of P(StSi(OEt)$_3$) as a viscous, sticky solid; GPC$_{PSt}$: M$_n$=3.64 kDa, Đ=1.77. $^1$H NMR (300 MHz): 1.09 (broad s, CH$_3$), 1.38 (s, ArCH$_2$CH$_2$Si), 1.85 (broad s, CH$_2$ of backbone), 2.1-2.4 (broad s, CH of backbone), 2.19 (s, ArCH$_2$CH$_2$Si), 3.65 (broad s, SiOCH$_2$CH$_3$), 6.46 (broad, s, Ar), 6.97 (broad, s, Ar).

Synthesis of Poly(tripropoxy(4-vinylphenethyl)silane) (P(StSi(OPr)$_3$))

A solution of StSi(OPr)$_3$ (0.84 g, 2.0 mmol) and BPO (48 mg, 0.2 mmol) in dry THF (8 mL) was degassed in a dried 15 mL round bottom flask equipped with a stir bar, perfluoro o-ring and high vacuum adapter by four freeze-pump-thaw cycles (10-10-5 min), sealed under vacuum (1-2 mm Hg) on the 4$^{th}$ cycle and stirred at 80° C. for 48 h. The polymerization solution was immersed in an ice water bath to quench the polymerization and precipitated in cold, dry acetonitrile (45 mL). The white, opaque solution was capped and placed in a freezer for 3 days, and then centrifuged for 5 min at 3000 rpm. The acetonitrile was decanted from the colorless, viscous precipitate to yield 0.12 g (18%) of P(StSi(OPr)$_3$) as a viscous, sticky solid; GPC$_{PSt}$: M$_n$=4.29 kDa, Đ=1.50. $^1$H NMR (300 MHz): 0.83 (broad s, CH$_3$), 1.47 (broad s, ArCH$_2$CH$_2$Si, SiOCH$_2$CH$_2$CH$_3$), 1.85 (broad s, CH$_2$ of backbone), 2.1-2.4 (broad s, CH of backbone), 2.18 (s, ArCH$_2$CH$_2$Si) 3.54 (broad s, SiOCH$_2$CH$_2$CH$_3$), 6.46 (broad, s, Ar), 6.95 (broad, s, Ar).

Synthesis of Poly((dodecyloxy)diethoxy(4-vinylphenethyl)silane) (P(StSi(ODod)(OEt)$_2$))

A solution of StSi(ODod)(OEt)$_2$ (1.1 g, 2.0 mmol) and BPO (48 mg, 0.2 mmol) in dry THF (8 mL) was degassed in a dried 15 mL round bottom flask equipped with a stir bar, perfluoro o-ring and high vacuum adapter by four freeze-pump-thaw cycles (10-10-5 min), sealed under vacuum (1-2 mm Hg) on the 4$^{th}$ cycle and stirred at 80° C. for 48 h. The polymerization solution was immersed in an ice water bath to quench the polymerization and precipitated in cold, dry acetonitrile (45 mL). The white, opaque solution was capped and placed in a freezer for 3 days, and then centrifuged for 5 min at 3000 rpm. The acetonitrile was decanted from the colorless, viscous precipitate to yield 0.052 g (6%) of P(StSi(ODod)(OEt)$_2$) as a viscous, sticky solid; GPC$_{PSt}$: M$_n$=4.18 kDa, Đ=1.72. $^1$H NMR (300 MHz): 0.86 (broad s, SiO(CH$_2$)$_{11}$CH$_3$), 1.08 (broad s, SiOCH$_2$CH$_3$) 1.43 (s, ArCH$_2$CH$_2$Si), 1.54 (broad s, SiOCH$_2$(CH$_2$)$_2$(CH$_2$)$_8$CH$_3$), 1.85 (broad s, CH$_2$ of backbone), 2.1-2.4 (broad s, CH of backbone), 2.27 (s, ArCH$_2$CH$_2$Si), 3.64 (broad s, SiOCH$_2$—), 6.46 (broad, s, Ar), 6.98 (broad, s, Ar).

Synthesis of Polystyrene by RAFT Polymerization

AIBN (6.0 mg, 3.5 µmol), CDTB (9.70 mg, 35 µmol) and styrene (1.0 mL, 8.7 mmol) were measured using a syringe ([M]:[CTA]:[I]=250:1:0.1). The solution was transferred to a 25 mL Schlenk tube equipped with a stir bar and capped with a glass stopper. The tube was degassed by four freeze-pump-thaw (5-10-5 min) cycles, backfilled with N$_2$ and sealed. The reaction was stirred at 70° C. for 24 h. The reaction was stopped by immersing in liquid N$_2$, warming to room temperature, dissolving in THF (1 mL) and precipitated into methanol (40 mL). The pink precipitate was collected on a glass frit and dried on the Schlenk line to yield 0.349 g (38%) polystyrene as a pink powder. $^1$H-NMR conv. 40%. GPC$_{PSt}$: M$_n$=9.80 kDa, Đ=1.27.

Copolymerizations

Synthesis of Poly(pentafluorostyrene-co-triethoxy (4-vinylphenethyl)silane) (P(PFS-co-StSi(OEt)$_3$)

The P(PFS-co-StSi(OEt)$_3$) copolymer in a 70:30 PFS:StSi(OEt)$_3$ monomer ratio was synthesized for calibration of the GPC UV-detector response at 254 nm to determine the monomer conversion and the grafting parameters of the PB-g-P(PFS-co-StSi(OEt)$_3$) graft copolymers.

A dried 15 mL round bottom flask equipped with a stir bar, perfluoro o-ring and high vacuum adapter was used. A solution of PFS (0.28 g, 1.4 mmol), StSi(OEt)$_3$ (0.22 g, 0.59 mmol) and BPO (0.05 g, 0.2 mmol) in dry THF (8 mL) was degassed by four freeze-pump-thaw cycles (10-10-5 min), sealed under vacuum (1-2 mm Hg) on the 4$^{th}$ cycle and immersed in an 80° C. oil bath for 48 h with constant stirring. The polymerization was quenched by immersing the flask in an ice water bath, exposing the contents to the atmosphere and precipitating in cold, dry acetonitrile (40 mL) to obtain a white, opaque solution. A clear, viscous polymer settled after storing the capped flask in the freezer overnight. The acetonitrile was decanted and the residue was dried to yield 0.10 g (22%) of P(PFS-co-StSi(OEt)$_3$) as a sticky, solid; GPC$_{PSt}$: M$_n$=11.9 kDa, Đ=1.43. $^1$H NMR (300 MHz): 1.09 (broad s, CH$_3$), 1.43 (s, ArCH$_2$CH$_2$Si), 1.85 (broad s, CH$_2$ of backbone), 2.1-2.4 (broad s, CH of backbone), 2.16 (s, ArCH$_2$CH$_2$Si), 3.66 (broad s, SiOCH$_2$CH$_3$), 6.46 (broad, s, Ar), 6.97 (broad, s, Ar). $^{19}$F NMR (297 MHz): −165.66 (s, C3-F), −159.54 (s, C4-F), −145.24 (broad s, C2-F).

Synthesis of Poly(pentafluorostyrene-co-tripropoxy (4-vinylphenethyl)silane) (P(PFS-co-StSi(OPr)$_3$)

The P(PFS-co-StSi(OPr)$_3$) copolymer in a 70:30 PFS:StSi(OPr)$_3$ monomer ratio was synthesized for calibration of the GPC UV-detector response at 254 nm to determine monomer conversion and the grafting parameters of the PB-g-P(PFS-co-StSi(OPr)$_3$) graft copolymers.

A dried 15 mL round bottom flask equipped with a stir bar, perfluoro o-ring and high vacuum adapter was used. A solution of PFS (0.31 g, 1.6 mmol), StSi(OPr)$_3$ (0.25 g, 0.61 mmol) and BPO (48 mg, 0.2 mmol) in dry THF (8 mL) was degassed by four freeze-pump-thaw cycles (10-10-5 min), sealed under vacuum (1-2 mm Hg) on the 4$^{th}$ cycle and immersed in an 80° C. oil bath for 48 h with constant stirring. The polymerization was quenched by immersing the flask in an ice water bath, exposing the contents to the atmosphere and precipitating in cold, dry acetonitrile (40 mL) to obtain a white, opaque solution. A clear, viscous polymer settled after storing the capped flask in the freezer overnight and the acetonitrile was decanted and the residue dried to yield 0.24 g (48%) of P(PFS-co-StSi(OPr)$_3$) as a sticky, solid; GPC$_{PSt}$: M$_n$=8.05 kDa, Đ=1.54. $^1$H NMR (300 MHz): 0.83 (broad s, CH$_3$), 1.47 (broad s, ArCH$_2$CH$_2$Si, SiOCH$_2$CH$_2$CH$_3$), 1.87 (broad s, CH$_2$ of backbone), 2.1-2.4 (broad s, CH of backbone), 2.10 (broad s, ArCH$_2$CH$_2$Si), 3.56 (broad s, SiOCH$_2$CH$_2$CH$_3$), 6.45 (broad, s, Ar), 6.95 (broad, s, Ar). $^{19}$F NMR (297 MHz): −165.27 (s, C3-F), −158.92 (s, C4-F), −144.76 (broad s, C2-F).

Synthesis of Poly(pentafluorostyrene-co-(dodecyloxy)diethoxy(4-vinylphenethyl)silane) (P(PFS-co-StSi(ODod)(OEt)$_2$)

The P(PFS-co-StSi(ODod)(OEt)$_2$) copolymer in a 70:30 PFS:StSi(ODod)(OEt)$_2$ monomer ratio was synthesized for calibration of the GPC UV-detector response at 254 nm to determine monomer conversion and the grafting parameters of the PB-g-P(PFS-co-StSi(ODod)(OEt)$_2$) graft copolymers.

A dried 15 mL round bottom flask equipped with a stir bar, perfluoro o-ring and high vacuum adapter was used. A solution of PFS (0.27 g, 1.4 mmol), StSi(ODod)(OEt)$_2$ (0.33 g, 0.61 mmol) and BPO (48 mg, 0.2 mmol) in dry THF (8 mL) was degassed by four freeze-pump-thaw cycles (10-10-5 min), sealed under vacuum (1-2 mm Hg) on the 4$^{th}$ cycle and immersed in an 80° C. oil bath for 48 h with constant stirring. The polymerization was quenched by immersing the flask in an ice water bath, exposing the contents to the atmosphere and precipitating in cold, dry acetonitrile (40 mL) to obtain a white, opaque solution. A clear, viscous polymer settled after storing the capped flask in the freezer overnight and the acetonitrile was decanted and the residue dried to yield 0.07 g (14%) of P(PFS-co-StSi(ODod)(OEt)$_2$) as a sticky, solid; GPC$_{PSt}$: M$_n$=14.4 kDa, Đ=1.85. $^1$H NMR (300 MHz): 0.86 (broad s, SiO ($CH_2$)$_{11}CH_3$), 1.10 (broad s, $SiOCH_2CH_3$), 1.26 (broad s, $SiO(CH_2)_3(CH_2)_8CH_3$), 1.43 (s, $ArCH_2CH_2Si$), 1.52 (broad s, $SiOCH_2(CH_2)_2(CH_2)_8CH_3$), 1.85 (broad s, $CH_2$ of backbone), 2.1-2.4 (broad s, CH of backbone), 2.10 (s, $ArCH_2CH_2Si$), 3.66 (broad s, $SiOCH_2$—), 6.46 (broad, s, Ar), 6.98 (broad, s, Ar). $^{19}F$ NMR (297 MHz): −165.14 (s, C3-F), −159.14 (s, C4-F), −144.59 (broad s, C2-F).

Synthesis of Poly(styrene-co-triethoxy(4-vinylphenethyl)silane) by RAFT Polymerization A dried 15 mL Schlenk tube was equipped with a stir bar and glass stopper. A solution of styrene (0.7 mL, 6 mmol), $StSi(OEt)_3$ (0.779 g, 2.65 mmol), cumyldithiobenzoate (9.5 mg, 35 μmol) and a stock solution of AIBN in n-butyl acetate (internal standard) (0.12 mL, 3.5 μmol, 0.024 mg AIBN in 5 mL n-butyl acetate) ([M]:[CTA]:[I]=250:1:0.1) was degassed by six freeze-pump-thaw cycles (5-10-10 min), backfilled with $N_2$ and sealed. The reaction was immersed in a 70° C. oil bath for 24 h. The reaction was stopped by immersing in liquid $N_2$, warmed to room temperature, dissolved in THF (1 mL), precipitated in cold, dry acetonitrile (40 mL), collected on a glass frit and dried in vacuo to yield 0.393 g (28%) of $P(St-co-StSi(OEt)_3)$ as a sticky, pink solid. $^1H$ NMR conv. 39%. GPC: $M_n$=17.4 kDa, Đ=2.43.

Synthesis of Poly(styrene-co-tripropoxy(4-vinylphenethyl)silane) by RAFT Polymerization A dried 15 mL Schlenk tube was equipped with a stir bar and glass stopper. A solution of styrene (0.7 mL, 6 mmol), $StSi(OPr)_3$ (0.886 g, 2.63 mmol), cumyldithiobenzoate (9.5 mg, 35 μmol) and a stock solution of AIBN in n-butyl acetate (internal standard) (0.12 mL, 3.5 μmol, 0.024 mg AIBN in 5 mL n-butyl acetate) ([M]:[CTA]:[I]=250:1:0.1) was degassed by six freeze-pump-thaw cycles (5-10-10 min), backfilled with $N_2$ and sealed. The reaction was immersed in a 70° C. oil bath for 24 h. The reaction was stopped by immersing in liquid $N_2$, warmed to room temperature, dissolved in THF (1 mL), precipitated in cold, dry acetonitrile (40 mL), collected on a glass frit and dried in vacuo to yield 0.582 g (38%) of $P(St-co-StSi(OPr)_3)$ as a sticky, pink solid. $^1H$ NMR conv. 44%. GPC: $M_n$=20.0 kDa, Đ=2.20.

Synthesis of Poly(styrene-co-(dodecyloxy)diethoxy (4-vinylphenethyl)silane) by RAFT Polymerization A dried 15 mL Schlenk tube was equipped with a stir bar and glass stopper. A solution of styrene (0.7 mL, 6.10 mmol), $StSi(ODod)(OEt)_2$ (1.14 g, 2.63 mmol), cumyldithiobenzoate (9.50 mg, 0.035 mmol) and a stock solution of AIBN in n-butyl acetate (internal standard) (0.12 mL, 0.0035 mmol, 0.024 mg AIBN in 5 mL n-butyl acetate) ([M]:[CTA]:[I]=250:1:0.1) was degassed by six freeze-pump-thaw cycles (5-10-10 min), backfilled with $N_2$ and sealed. The reaction was immersed in a 70° C. oil bath for 24 h. The reaction was stopped by immersing in liquid $N_2$, warmed to room temperature, dissolved in THF (1 mL), precipitated in cold, dry acetonitrile (40 mL), collected on a glass frit and dried in vacuo to yield 0.320 g (18%) of $P(St-co-StSi(ODod)(OEt)_2)$ as a sticky, pink solid. $^1H$ NMR conv. 43%. GPC: $M_n$=10.7 kDa, Đ=1.62.

Graft Copolymerizations

Synthesis of Poly(butadiene-graft-2,3,4,5,6-pentafluorostyrene) (PB-g-PPFS)

The PB-g-PPFS graft copolymer was synthesized following a previously reported procedure. The amount of initiator and the reaction temperature for the graft copolymerization was varied to vary the molecular weight of the PPFS graft of the PB-g-PPFS. The PFS and PB were used in a molar ratio of 2:1, respectively, relative to the molecular weight of the PB repeat unit.

A dry round bottom flask equipped with a stir bar, high vacuum joint and perfluoro o-ring was used. A solution of PB (1.23 g, 22.7 mmol repeat units) in dry THF (73 mL) was degassed by five freeze-pump-thaw cycles (15-15-10 min) and stirred at 50° C. under $N_2$ overnight (15 h) to solubilize PB. PFS (8.80 g, 45.4 mmol) and BPO (0.55 g, 2.3 mmol) were added to the PB solution and degassed by five freeze-pump-thaw cycles (20-20-20 min). The flask was sealed under vacuum on the $5^{th}$ cycle (1 mm Hg) and immersed in a 60° C. oil bath with constant stirring. After 48 h, the polymerization was stopped by immersing in an ice water bath, exposing the contents to the atmosphere and precipitating into a 1% w/v $N_2$ saturated solution of BHT in methanol (500 mL) to obtain a white precipitate. The white precipitate was collected in a glass frit and dried in vacuo overnight at room temperature to yield 7.29 g (73%) of a white, electrostatic powder; $GPC_{PSt}$: $M_n$=3.98×10$^5$ Da, Đ=1.63. All crude samples contained the PB-g-PPFS graft copolymer, PPFS homopolymer and up to a trace amount of unreacted PB homopolymer. The crude mixture was used as the coupling agent and referred to as PB-g-PPFS throughout. $^1H$ NMR (300 MHz): 2.00 (broad s, $CH_2CHAr$), 2.09 (s, cis-$CH_2$—CH= of PB), 2.39 and 2.74 (broad s, $CH_2CHAr$), 5.39 (s, cis-$CH_2CH$= of PB). $^{19}F$ NMR (297 MHz): −164.3 (broad s, C3-F), −157.2 (broad s, C4-F), −146.0 (broad s, C2-F).

Synthesis of Poly(butadiene-graft-(2,3,4,5,6-pentafluorostyrene-co-triethoxy(4-vinylphenethyl)silane)) (PB-g-P(PFS-co-StSi(OEt)$_3$)

A dry round bottom flask equipped with a stir bar, high vacuum joint and perfluoro o-ring was used. A solution of PB (1.01 g, 18.7 mmol repeat units) in dry THF (80 mL) was degassed by four freeze-pump-thaw cycles (15-15-15 min) and stirred at 50° C. under $N_2$ overnight (15 h) to solubilize PB. PFS (5.02 g, 26 mmol), $StSi(OEt)_3$ (3.37 g, 11.1 mmol) and BPO (0.45 g, 1.8 mmol) were added to the PB solution and degassed by five freeze-pump-thaw cycles (20-15-15 min). The flask was sealed under vacuum on the $5^{th}$ cycle (1-2 mm Hg) and immersed in an 80° C. oil bath with constant stirring. After 48 h, the polymerization was stopped by immersing it in an ice water bath, exposing the contents to the atmosphere and approximately half of the THF was removed by trap-to-trap distillation. The solution was coagulated with cold, dry acetonitrile (50 mL) to obtain a white, gel-like precipitate that was then precipitated further into cold, dry acetonitrile (250 mL) to obtain a sticky, white precipitate. The white precipitate was collected in a glass frit and dried in vacuo at room temperature on the Schlenk line to yield 3.97 g (43%) of a white, rubber-like polymer; $GPC_{PSt}$: $M_n$=42.0×10$^5$ Da, Đ=1.06. All crude samples contained the PB-g-P(PFS-co-StSi(OEt)$_3$) graft copolymer, P(PFS-co-StSi(OEt)$_3$) non-grafted copolymer and up to a trace amount of unreacted PB homopolymer. The crude mixture was used as the coupling agent and referred to as PB-g-P(PFS-co-StSi(OEt)$_3$) throughout. $^1H$ NMR (300 MHz): 1.09 (broad s, $CH_3$), 1.29 (broad s, $ArCH_2CH_2Si$), 2.00 (broad s, $CH_2CHAr$), 2.09 (s, cis-$CH_2$—CH= of PB), 2.32 and 2.74 (broad s, $CH_2CHAr$), 3.66 (broad s, $OCH_2CH_3$), 5.38 (s, cis-$CH_2CH$= of PB), 6.44 (broad s, Ar), 6.97 (broad s, Ar). $^{19}$F NMR (297 MHz): −162.48 (broad s, C3-F), −156.45 (broad s, C4-F), −142.10 (broad s, C2-F).

Synthesis of Poly(butadiene-graft-(2,3,4,5,6-pentafluorostyrene-co-tripropoxy(4-vinylphenethyl)silane)) (PB-g-P(PFS-co-StSi(OPr)$_3$)

A dry round bottom flask equipped with a stir bar, high vacuum joint and perfluoro o-ring was used. A solution of PB (1.02 g, 18.8 mmol repeat units) in dry THF (80 mL) was degassed by four freeze-pump-thaw cycles (15-15-15 min) and stirred at 50° C. under N$_2$ overnight (15 h) to solubilize PB. PFS (5.03 g, 25.9 mmol), StSi(OPr)$_3$ (3.85 g, 11.1 mmol) and BPO (0.45 g, 1.8 mmol) were added to the PB solution and degassed by five freeze-pump-thaw cycles (20-15-15 min). The flask was sealed under vacuum on the 5$^{th}$ cycle (1-2 mm Hg) and immersed in an 80° C. oil bath with constant stirring. After 48 h, the polymerization was stopped by immersing in an ice water bath, exposing the contents to the atmosphere and approximately half of the THF was removed by trap-to-trap distillation. The solution was coagulated with cold, dry acetonitrile (50 mL) to obtain a white, gel-like precipitate, which was then precipitated further into cold, dry acetonitrile (250 mL) to obtain a sticky, white precipitate. The white precipitate was collected in a glass frit and dried in vacuo at room temperature on the Schlenk line to yield 2.26 g (23%) of a white, rubber-like polymer; GPC$_{PSt}$: M$_n$=13.2×10$^5$ Da, Đ=1.04. All crude samples contained the PB-g-P(PFS-co-StSi(OPr)$_3$) graft copolymer, P(PFS-co-StSi(OPr)$_3$) non-grafted copolymer and up to a trace amount of unreacted PB homopolymer. The crude mixture was used as the coupling agent and referred to as PB-g-P(PFS-co-StSi(OPr)$_3$) throughout. $^1$H NMR (300 MHz): 0.83 (broad s, CH$_3$), 1.21 (broad s, OCH$_2$CH$_2$CH$_3$), 1.47 (broad s, ArCH$_2$CH$_2$Si), 2.00 (broad s, CH$_2$CHAr), 2.08 (s, cis-CH$_2$—CH= of PB), 2.35 (broad s, CH$_2$CHAr), 3.55 (broad s, OCH$_2$CH$_2$CH$_3$), 5.38 (s, cis-CH$_2$CH= of PB), 6.44 (broad s, Ar), 6.92 (broad s, Ar). $^{19}$F NMR (297 MHz): −162.41 (broad s, C3-F), −156.16 (broad s, C4-F), −141.95 (broad s, C2-F).

Synthesis of Poly(butadiene-graft-(2,3,4,5,6-pentafluorostyrene-co-(dodecyloxy)diethoxy(4-vinylphenethyl)silane)) (PB-g-P(PFS-co-StSi(ODod)(OEt)$_2$)

A dry round bottom flask equipped with a stir bar, high vacuum joint and perfluoro o-ring was used. A solution of PB (1.15 g, 21.3 mmol repeat units) in dry THF (88 mL) was degassed by four freeze-pump-thaw cycles (15-15-15 min) and stirred at 50° C. under N$_2$ overnight (15 h) to solubilize PB. PFS (5.77 g, 29.8 mmol), StSi(ODod)(OEt)$_2$ (4.44 g, 12.8 mmol) and BPO (0.52 g, 2.13 mmol) were added to the PB solution and degassed by five freeze-pump-thaw cycles (20-15-20 min). The flask was sealed under vacuum on the 5$^{th}$ cycle (1-2 mm Hg) and immersed in an 80° C. oil bath with constant stirring. After 48 h, the polymerization was stopped by immersing in an ice water bath, exposing the contents to the atmosphere and approximately half of the THF was removed by trap-to-trap distillation. The solution was coagulated with cold, dry acetonitrile (50 mL) to obtain a white, gel-like precipitate, which was then precipitated further into cold, dry acetonitrile (250 mL) to obtain a sticky, white precipitate. The white precipitate was collected in a glass frit and dried in vacuo at room temperature on the schlenk line to yield 7.38 g (59%) of a white, rubber-like polymer; GPC$_{PSt}$: M$_n$=5.88×10$^5$ Da, Đ=1.67. All crude samples contained the PB-g-P(PFS-co-StSi(ODod)(OEt)$_2$) graft copolymer, P(PFS-co-StSi(ODod)(OEt)$_2$) non-grafted copolymer and up to a trace amount of unreacted PB homopolymer. The crude mixture was used as the coupling agent and referred to as PB-g-P(PFS-co-StSi(ODod)(OEt)$_2$) throughout. $^1$H NMR (300 MHz): 0.88 (broad s, Si(CH$_2$)$_{11}$CH$_3$), 1.09 (broad s, OCH$_2$CH$_3$), 1.26 (broad s, O(CH$_2$)$_3$(CH$_2$)$_8$CH$_3$), 1.47 (broad s, ArCH$_2$CH$_2$Si), 1.85 (s, OCH$_2$(CH$_2$)$_2$(CH$_2$)$_8$CH$_3$), 2.00 (broad s, CH$_2$CHAr), 2.09 (s, cis-CH$_2$—CH= of PB), 2.32-2.74 (broad s, CH$_2$CHAr), 3.64 (broad s, OCH$_2$(CH$_2$)$_{10}$CH$_3$), 3.74 (broad s, OCH$_2$CH$_3$), 5.38 (s, cis-CH$_2$CH= of PB), 6.47 (broad s, Ar), 6.93 (broad s, Ar). $^{19}$F NMR (297 MHz): −162.76 (broad s, C3-F), −157.36 (broad s, C4-F), −141.92 (broad s, C2-F).

What is claimed is:

1. A vulcanizable composition comprising:
   a curative;
   a filler comprising carbon black and silica; and
   a polydiene grafted with a mer unit derived from the polymerization of a fluorine substituted styrene compound and a mer unit derived from the polymerization of styrene compound containing a hydrocarbyloxysilane functional group, where the styrene compound containing a hydrocarbyloxysilane functional group is defined by the formula:

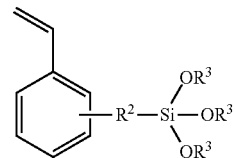

where R$^2$ is a divalent organic group and each R$^3$ is individually a monovalent organic group.

2. The vulcanizable composition of claim 1, where R$^2$ is hydrocarbon group with from 1 to about 18 carbon atoms.

3. The vulcanizable composition of claim 1, where each R$^3$ is individually a hydrocarbon group with from 1 to about 18 carbon atoms.

4. The vulcanizable composition of claim 2, where each R$^3$ is individually a hydrocarbon group with from 1 to about 18 carbon atoms.

5. The vulcanizable composition of claim 1, where the fluorine substituted styrene compound is defined by the formula:

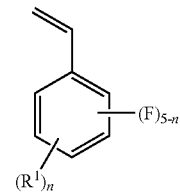

where R$^1$ is a monovalent organic group and n is an integer selected from 0 and 1.

6. The vulcanizable composition of claim 1, where the fluorine substituted styrene compound is defined by the formula:

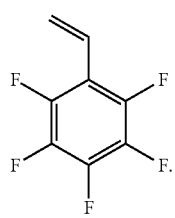

7. The vulcanizable composition of claim 1, further comprising one or more synthetic or natural rubbers.

8. The vulcanizable composition of claim 1, further comprising:
a styrene-diene copolymer.

9. A tire or tire component comprising the reaction product of the vulcanizable composition of claim 1.

10. A vulcanizable composition comprising:
a curative;
a filler comprising carbon black and silica; and
a polydiene grafted with a mer unit derived from the polymerization of a fluorine substituted styrene compound and a mer unit derived from the polymerization of styrene compound containing a hydrocarbyloxysilane functional group, where the styrene compound containing a hydrocarbyloxysilane functional group is defined by the formula:

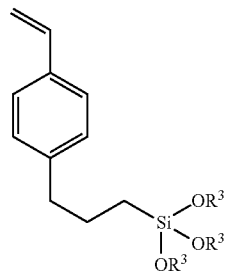

where each $R^3$ is individually monovalent organic group.

11. The vulcanizable composition of claim 10, where each $R^3$ is individually a hydrocarbon group with from 1 to about 18 carbon atoms.

* * * * *